(12) United States Patent
Liao et al.

(10) Patent No.: US 9,654,307 B1
(45) Date of Patent: May 16, 2017

(54) COMMUNICATION APPARATUS

(71) Applicant: MStar Semiconductor, Inc., Hsinchu, Hsien (TW)

(72) Inventors: Yi-Ying Liao, Hsinchu Hsien (TW); Tai-Lai Tung, Hsinchu Hsien (TW)

(73) Assignee: MStar Semiconductor, Inc., Hsinchu, Hsien (TW)

( * ) Notice: Subject to any disclaimer, the term of this patent is extended or adjusted under 35 U.S.C. 154(b) by 0 days.

(21) Appl. No.: 15/343,288

(22) Filed: Nov. 4, 2016

(30) Foreign Application Priority Data

May 9, 2016 (TW) .............................. 105114253 A

(51) Int. Cl.
*H04L 25/02* (2006.01)
*H04B 10/2531* (2013.01)
*H04L 25/03* (2006.01)
*H04L 12/863* (2013.01)
*H04L 27/26* (2006.01)

(52) U.S. Cl.
CPC .... *H04L 25/0202* (2013.01); *H04L 25/03885* (2013.01); *H04L 47/6245* (2013.01); *H04B 10/2531* (2013.01); *H04L 25/03828* (2013.01); *H04L 27/2695* (2013.01)

(58) Field of Classification Search
CPC .... H04B 3/235; H04B 3/493; H04B 10/2531; H04L 25/03828; H04L 27/2695
See application file for complete search history.

(56) References Cited

U.S. PATENT DOCUMENTS

| | | | | |
|---|---|---|---|---|
| 6,002,722 A | * | 12/1999 | Wu ....................... | H04L 1/0003 375/222 |
| 2005/0259767 A1 | * | 11/2005 | Garmany ............... | H04B 7/005 375/343 |
| 2011/0007789 A1 | * | 1/2011 | Garmany .............. | H04L 25/022 375/224 |

* cited by examiner

*Primary Examiner* — Ross Varndell
(74) *Attorney, Agent, or Firm* — Edell, Shapiro & Finnan, LLC

(57) ABSTRACT

A communication apparatus for correcting a situation of a spectrum inverted signal includes a channel estimation module and an equalization module. The channel estimation module determines a channel estimation parameter, and receives at least one frame signal to generate a convolution restored frame signal corresponding to the frame signal. The equalization module includes a first computation circuit and a second computation circuit. The first computation circuit receives the channel estimation parameter and the convolution restored frame signal to generate a transformation channel estimation parameter and a transformed convolution restored frame signal. The second computation circuit receives the transformed channel estimation parameter and the transformed convolution restored frame signal to generate an original frame signal corresponding to the frame signal. The first computation circuit further feeds back a transient original frame signal to the channel estimation module to update the channel estimation parameter.

16 Claims, 6 Drawing Sheets

COMMUNICATION APPARATUS

This application claims the benefit of Taiwan application Serial No. 105114253, filed May 9, 2016, the subject matter of which is incorporated herein by reference.

BACKGROUND OF THE INVENTION

Field of the Invention

The invention relates in general to a communication apparatus, and more particularly to a communication apparatus capable of processing spectrum inverted signals.

Description of the Related Art

In a communication system, on a transmission path from a transmitter to a receiver, a transmission signal encounters shielding effects of various obstacles on the path in a way that a reception error rate of the receiver is increased. In the above situation, in known technologies, a communication apparatus is provided at the receiver to perform compensation on the transmission signal to lower the transmission error rate. However, when the transmission signal the communication apparatus receives is a spectrum inverted signal, the estimation on the transmission channel of the transmission signal cannot be accurately conducted, subsequently leading to an inaccurate estimated result and an inoperable compensation operation.

Therefore, there is a need for a communication apparatus capable of processing spectrum inverted signals.

SUMMARY OF THE INVENTION

It is a primary object of the present invention to provide a communication apparatus capable of processing spectrum inverted signals to improve issues of the prior art.

The present invention discloses a communication apparatus for correcting a situation of a spectrum inverted signal. The communication apparatus includes: a channel estimation module, determining a channel estimation parameter, receiving at least one frame signal to generate a convolution restored frame signal, wherein the channel estimation parameter, the frame signal and the convolution restored frame signal are time-domain signals; and an equalization module, coupled to the channel estimation module, including a first computation circuit that receives the channel estimation parameter and the convolution restored frame signal to generate a transformed channel estimation parameter and a transformed convolution restored frame signal, wherein the transformed channel estimation parameter and the transformed convolution restored frame signal are frequency-domain signals, and a second computation circuit that is coupled to the first computation circuit and receives the transformed channel estimation parameter and the transformed convolution restored frame signal to generate an original frame signal corresponding to the frame signal, wherein the original frame signal is a time-domain signal. The first computation circuit further feeds back a transient original frame signal to the channel estimation module to update the channel estimation parameter.

The present invention further discloses a method for correcting a situation of a spectrum inverted signal that a communication apparatus receives. The communication apparatus includes a channel estimation module and an equalization module. The method includes: determining a channel estimation parameter; receiving at least one frame signal by the channel estimation module to generate a convolution restored frame signal corresponding to the frame signal, wherein the channel estimation parameter, the frame signal and the convolution restored frame signal are time-domain signals; receiving the channel estimation parameter and the convolution restored frame signal by a first computation circuit of the equalization module to generate a transformed channel estimation parameter and a transformed convolution restored frame signal, wherein the transformed channel estimation parameter and the transformed convolution restored frame signal are frequency-domain signals; and receiving the transformed channel estimation parameter and the transformed convolution restored frame signal by a second computation circuit of the equalization module to generate an original frame signal corresponding to the frame signal, wherein the original frame signal is a time-domain signal. The first computation circuit further feeds back a transient original frame signal to the channel estimation module to update the channel estimation parameter.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 1:
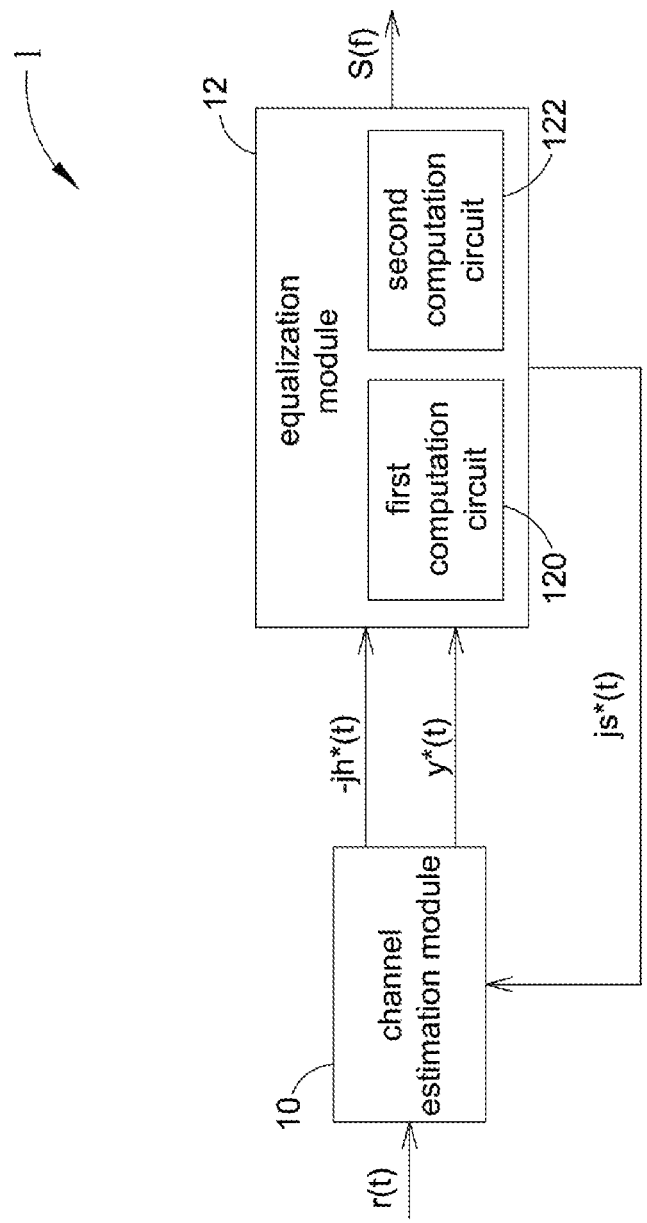
FIG. 1 is a block diagram of an analog-to-digital converting device according to an embodiment of the present invention.

FIG. 1 shows a block diagram of a communication apparatus 1 according to an embodiment of the present invention. As shown in FIG. 1, the communication apparatus 1, suitable for a Digital Terrestrial Multimedia Broadcast (DTMB) standard, includes a channel estimation module 10 and an equalization module 12, and may be disposed at a receiver of a communication system (not shown). When the receiver receives a frame signal, the communication apparatus 1 may be used to correct a situation of a spectrum inverted signal. Meanwhile, the communication apparatus 1 is capable of accurately estimating a transmission channel including a spectrum inverted signal to provide a better compensation effect for subsequent frame signals. The communication apparatus 1 of the embodiment is also suitable for a frame signal including a normal spectrum signal. Preferably, the frame signal transmitted according to the DTMB standard includes a plurality of frame header signals and a plurality of frame body signals. Wherein, each frame header signal is a pseudo noise (PN) sequence coded and includes 420, 595 or 945 symbols; each frame body signal is a Bose Chaudhuri Hocquenghem coded and low-density parity check (LDPC) coded, and includes 3780 symbols.

The operation of the communication apparatus 1 may be divided into two working cycles. In the first working cycle, the channel estimation module 10 determines a channel estimation parameter. When a frame signal the channel estimation module 10 receives is a frame header signal, the equalization module 12 returns a transient original frame signal of a previous frame (i.e., a conjugate signal corresponding to the original frame signal) to the channel estimation module 10 to adaptively update the previously determined channel estimation parameter. In a second working cycle following the first working cycle, when the frame signal the channel estimation module 10 receives is a frame body signal, another original frame signal, to be used in the next first working cycle, is correspondingly generated from the frame body signal through the operations of the channel estimation module 10 and the equalization module 12. As such, the estimation operation is repeatedly performed on the frame signals in the two alternating working cycles, hence not only correcting frame signals containing spectrum inverted signals but also generating more accurate frames signals for the communication system to use.

Operation details of the channel estimation module 10 and the equalization module 12 are described below, again with reference to FIG. 1. In the embodiment, the channel estimation module 12 determines a channel estimation parameter $-jh^*(t)$, where $j=\sqrt{-1}$, and * represents a complex conjugate. The channel estimation module 10 further receives at least one frame signal r(t), and performs a convolution restoration operation on a frame body signal to generate a convolution restored frame signal $y^*(t)$ corresponding to the frame signal r(t). The frame signal r(t) in this embodiment may further include a frame header signal. For simplicity, both of the frame header signal and the frame body signal are represented by the frame signal r(t) in this embodiment. In the embodiment below, the signals used include time-domain signals x(t) and frequency-domain signals x(f), where x represents different types of signals, t represents the time and f represents the frequency. Further, the convolution restoration operation in this embodiment refers to a sequence of input signals (including frame body signals and frame header signals) and a channel impulse response, and performs a circular convolution calculation based on the two to obtain another output sequence corresponding to the input signals. Details of the calculation and formulae actually conducted are not the main spirit of the present invention, and shall not be further discussed.

After the communication apparatus 1 receives the frame signal r(t), the channel estimation module 10 performs a channel estimation operation to output the channel estimation parameter $-jh^*(t)$, and further performs a convolution restoration operation to output the convolution restored frame signal $y^*(t)$. The first computation circuit 120 then performs a fast Fourier transform (FFT) operation to output a transformed convolution restored frame signal, a transformed channel estimation parameter and a transformed equalized frame signal. Next, the second computation circuit 122 performs another conjugate operation and a real-imaginary permutation operation. In the above situation, regardless of whether the frame signal r(t) includes a spectrum inverted signal, the equalization signal 12 is capable of generating an original frame signal s(t) corresponding to the frame signal r(t). Further, the transformed equalized frame signal S(f) obtained in this embodiment may be transmitted to a signal-to-noise ratio (SNR) estimation module of the communication apparatus 1 to estimate the SNR corresponding to the current frame signal r(t), and the estimated SNR is provided to the communication system for subsequent operations—such is encompassed within the scope of the present invention.

Figure 2A:
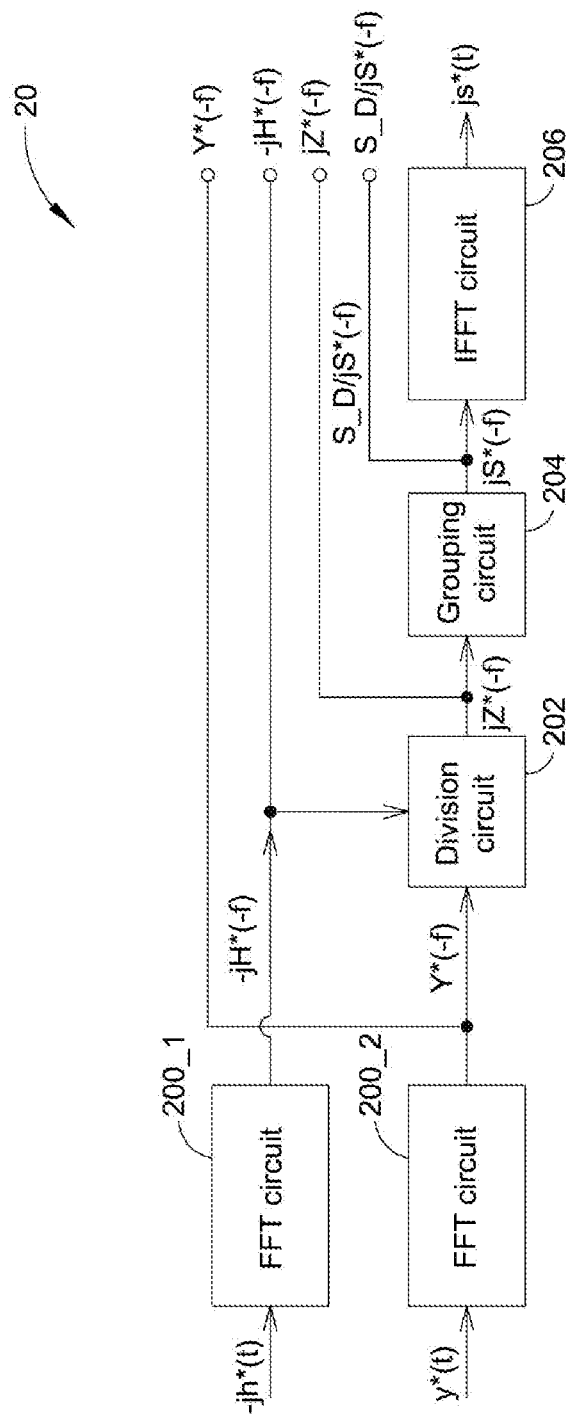
FIG. 2A is a detailed block diagram of a first computation circuit according to the embodiment in FIG. 1.

FIG. 2A shows a detailed block diagram of a first computation circuit 20 in the embodiment in FIG. 1. As shown in FIG. 2A, the first computation circuit 20 includes FFT circuits 200_1 and 200_2, a division circuit 202, a grouping circuit 204 and an inverse fast Fourier transform (IFFT) circuit 206. The FFT circuits 200_1 and 200_2, coupled to the channel estimation module 10, receives the convolution restored frame signal $y^*(t)$ and the channel estimation parameter $-jh^*(t)$, and generates a transformed convolution restored frame signal $Y^*(-f)$ signal and a transformed channel estimation parameter $-jH^*(-f)$ through an FFT operation. As the frame signals include spectrum inverted signals, the representations of the transformed convolution restored frame signal $Y^*(-f)$ signal and the transformed channel estimation parameter $-jH^*(-f)$ after the FFT operation represent frequency inverted signals. The division circuit 202, coupled to the FFT circuits 200_1 and 200_2, receives the transformed convolution restored frame signal $Y^*(-f)$ signal and the transformed channel estimation parameter $-jH^*(-f)$, and divides the transformed convolution restored frame signal $Y^*(-f)$ signal by the transformed channel estimation parameter $-jH^*(-f)$ to generate a transformed equalized frame signal $jZ^*(-f)$, which also represents a frequency inverted signal. The grouping circuit 204, coupled to the division circuit 202, receives the transformed equalized frame signal $jZ^*(-f)$, and performs a hard decision to output a transformed original frame signal $jS^*(-f)$. Meanwhile, the grouping circuit 204 may determine whether the transformed equalized frame signal $jZ^*(-f)$ is a spectrum inverted signal, and at the same time correspondingly determines whether the transformed equalized frame signal $jZ^*(-f)$ is a system information carrier or a data carrier according to a sequence parameter corresponding to the transformed equalized frame signal $jZ^*(-f)$ to further output a determination signal S_D (i.e., correspondingly determining whether the transformed equalized frame signal $jZ^*(-f)$ is a spectrum inverted signal) and the transformed original frame signal $jS^*(-f)$. The mechanism for detecting a spectrum inverted signal is generally known to one person skilled in the art, and shall be omitted herein. For example, the sequence parameter of the transformed equalized frame signal $jZ^*(-f)$ may be 0, 1, 2, . . . , 3778, 3779. When the grouping circuit 204 determines that the transformed equalized frame signal $jZ^*(-f)$ is a spectrum inverted signal, the grouping circuit 204 further refers to the sequence parameter of the transformed equalized frame signal $jZ^*(-f)$ to determine the pattern of a carrier. More specifically, when the sequence parameter of the transformed equalized frame signal $jZ^*(-f)$ falls in 0 to 18 and 3763 to 3779, the transformed equalized frame signal $jZ^*(-f)$ is determined as a system information carrier, and a hard decision is then performed on each system information carrier by a decision circuit (not shown) corresponding to the system information carrier to obtain symbol signals that the transmitter transmits. For example, when the system information carrier uses $\tau/2$-binary phase shift keying (BPSK) for transmission, a $\tau/2$-BPSK decision circuit is correspondingly used. When the sequence parameter of the transformed equalized frame signal $jZ^*(-f)$ falls in 19 to 3762, the transformed equalized frame signal $jZ^*(-f)$ is determined as a data carrier, and a hard decision is performed on each data carrier by another decision circuit corresponding to the data carrier to obtain symbol signals that the transmitter transmits. For example, when the data carrier uses 16 quadrature amplitude modulation (16QAM) for transmission, a 16QAM decision circuit is correspondingly used. Further, when the grouping circuit 204 has determined that the transformed equalized frame signal jZ*(−f) is a normal spectrum signal, the grouping circuit 204 further refers to the parameter sequence of the transformed equalized frame signal jZ*(−f) to determine the pattern of the carrier. More specifically, when the sequence parameter of the transformed equalized frame signal jZ*(−f) falls between 0 and 17 and 3762 and 3779, the transformed equalized frame signal jZ*(−f) is determined as a system information carrier. When the sequence parameter of the transformed equalized frame signal jZ*(−f) falls between 18 and 3761, the transformed equalized frame signal jZ*(−f) is determined as a data carrier. It should be noted that, the method for setting the sequence parameter in this embodiment is an example for illustration purposes and is not to be construed as limitations to the present invention. The IFFT circuit 206, coupled to the grouping circuit 204, receives the transformed original frame signal jS*(−f) to perform an IFFT operation to correspondingly generate a transient original frame signal js*(t), and at the same time feeds back the transient original frame signal js(*t) to the channel estimation module 10 to update the channel estimation parameter −jh*(t).

Figure 2B:
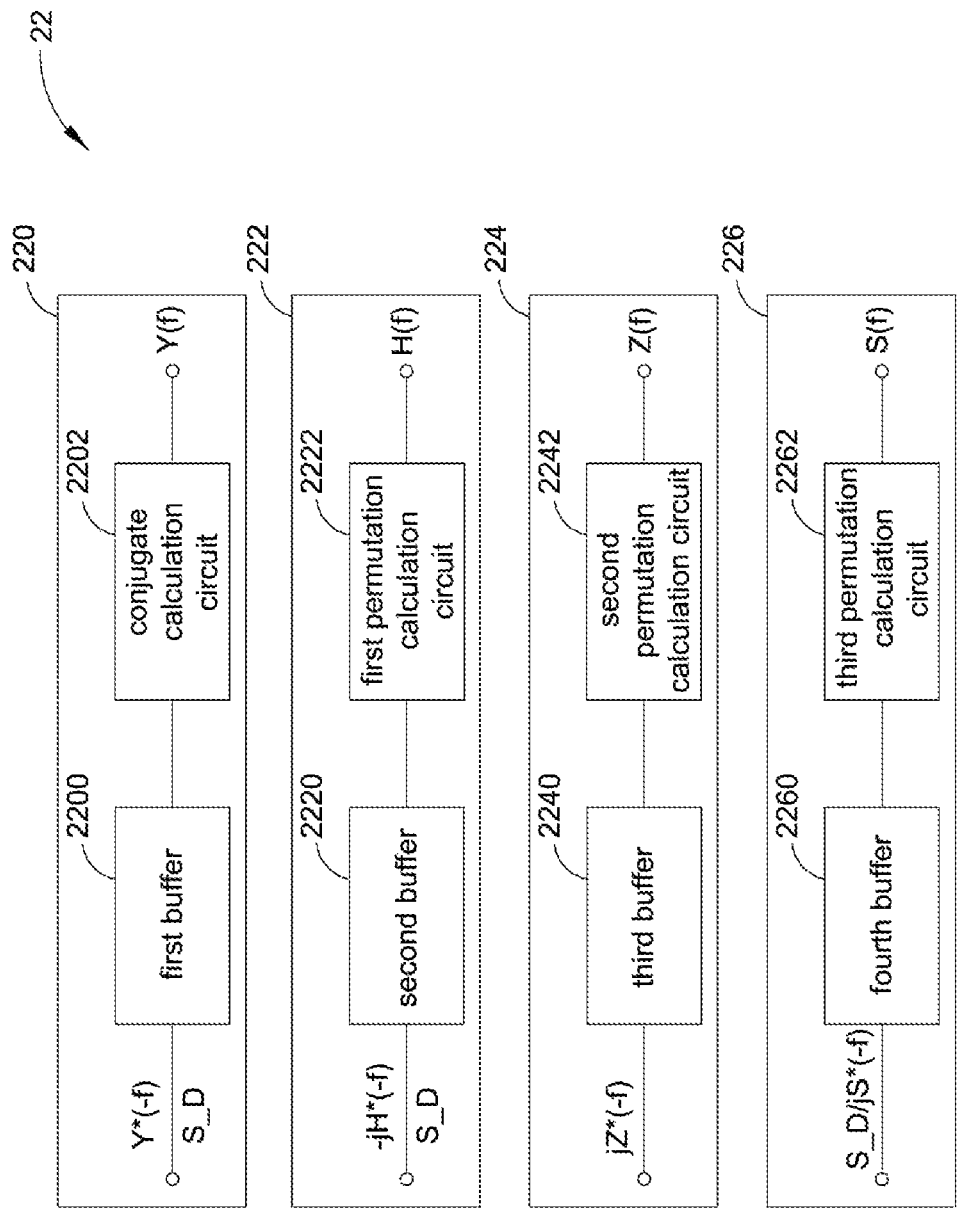
FIG. 2B is a detailed block diagram of a second computation circuit according to the embodiment in FIG. 1.

FIG. 2B shows a detailed block diagram of a second computation circuit 22 in the embodiment in FIG. 1. As shown in FIG. 2B, the second computation circuit 22 includes a first calculation circuit 220, a second calculation circuit 222, a third calculation circuit 224 and a fourth calculation circuit 226. The first calculation circuit 220 includes a first buffer 2200 and a conjugate calculation circuit 2022. The first buffer 2200 receives the transformed convolution restored frame signal Y*(−f). The conjugate calculation circuit 2202, coupled to the first buffer 2200, transforms the transformed convolution restored frame signal Y*(−f) to a calculated frame signal Y(f) (may correspond to the originally received frame signal r(t)). The second calculation circuit 222 includes a second buffer 2220 and a first permutation calculation circuit 2222. The second buffer 2220 receives the transformed channel estimation parameter −jH*(−f). The first permutation calculation circuit 2222, coupled to the second buffer 2220, transforms the transformed channel estimation parameter −jH*(−f) to a calculated channel estimation parameter H(f). The third calculation circuit 224 includes a third buffer 2240 and a second permutation calculation circuit 2242. The third buffer 2240 receives the transformed equalized frame signal jZ*(−f). The second permutation calculation circuit 2242, coupled to the third buffer 2240, transforms the transformed equalized frame signal jZ*(−f) to a calculated equalized frame signal Z(f). The fourth calculation circuit 226 includes a fourth buffer 2260 and a third permutation calculation circuit 2262. The fourth buffer 2260 receives the transformed original frame signal jS*(−f). The third permutation calculation circuit 2262, coupled to the fourth buffer 2260, transforms the transformed original frame signal jS*(−f) to the original frame signal S(f). As such, the second computation circuit 22 may obtain the original frame signal S(f), and output the original frame signal S(f), the calculated frame signal Y(f), and the calculated channel estimation parameter H(f) to an SNR estimation module of the communication apparatus 1 for an SNR operation. Further, the calculated equalized frame signal Z(f) is transmitted to a BCH/LDPC decoder of the communication apparatus 1 for associated operations.

In the embodiment, the first buffer 2200, the second buffer 2220, the third buffer 2240 and the fourth buffer 2260 further receive the determination signal S_D, so as to determine to output the transformed convolution restored frame signal Y*(−f), the transformed channel estimation parameter −jH*(−f), the transformed equalized frame signal jZ*(−f) and the transformed original frame signal jS*(−f) according to a first-in-first-out (FIFO) sequence or a last-in-first-out (LIFO) sequence. For example, in the embodiment, the first buffer 2200, the second buffer 2220, the third buffer 2240 and the fourth buffer 2260 are sequentially written with the transformed convolution restored frame signal Y*(−f) having a sequence parameter 0, 1, 2, . . . , 3778 and 3779, the transformed channel estimation parameter −jH*(−f), the transformed equalized frame signal jZ*(−f) and the transformed original frame signal jS*(−f). Further, when the grouping circuit 204 determines that the original frame signal jS*(−f) is a spectrum inverted signal, the first buffer 2200, the second buffer 2220, the third buffer 2240 and the fourth buffer 2260 sequentially output the transformed convolution restored frame signal Y*(−f) having a sequence parameter 0, 1, 2, . . . , 3778 and 3779, the transformed channel estimation parameter −jH*(−f), the transformed equalized frame signal jZ*(−f) and the transformed original frame signal jS*(−f), and respectively transmit the four signals to the conjugate calculation circuit 2202, the first permutation calculation circuit 2222, the second permutation calculation circuit 2242 and the third permutation calculation circuit 2262 for associated operations.

Further, the conjugate calculation circuit 2202 performs a conjugate operation. More specifically, the conjugate calculation circuit 2202 divides the transformed convolution restored frame signal Y*(−f) to a real signal and an imaginary signal, adds a negative sign to the imaginary signal to form a new imaginary signal, and outputs the original real signal and the new imaginary signal to form the calculated frame signal Y(f). The first permutation calculation circuit 2222 performs a real-imaginary permutation operation. More specifically, the first permutation calculation circuit 2222 divides the transformed channel estimation parameter −jH*(−f) to a real signal and an imaginary signal, changes the original real signal to a new imaginary signal and the original imaginary signal to a new real signal, and multiplies the new imaginary signal and the new imaginary signal by a negative sign to form the calculated channel estimation parameter H(f). The second permutation calculation circuit 2422 and the third permutation calculation circuit 2262 also perform another real-imaginary permutation operation. However, differences of the second permutation calculation circuit 2422 and the third permutation calculation circuit 2262 are that, the equalized frame signal jZ*(−f) or the transformed equalized frame signal jS*(−f) is divided into a real signal and an imaginary signal, the original real signal is changed to a new imaginary signal and the original imaginary signal to a new real signal, and the new real signal and the new imaginary signal are outputted to form the calculated equalized frame signal Z(f) or the original frame signal S(f).

Figure 3A:
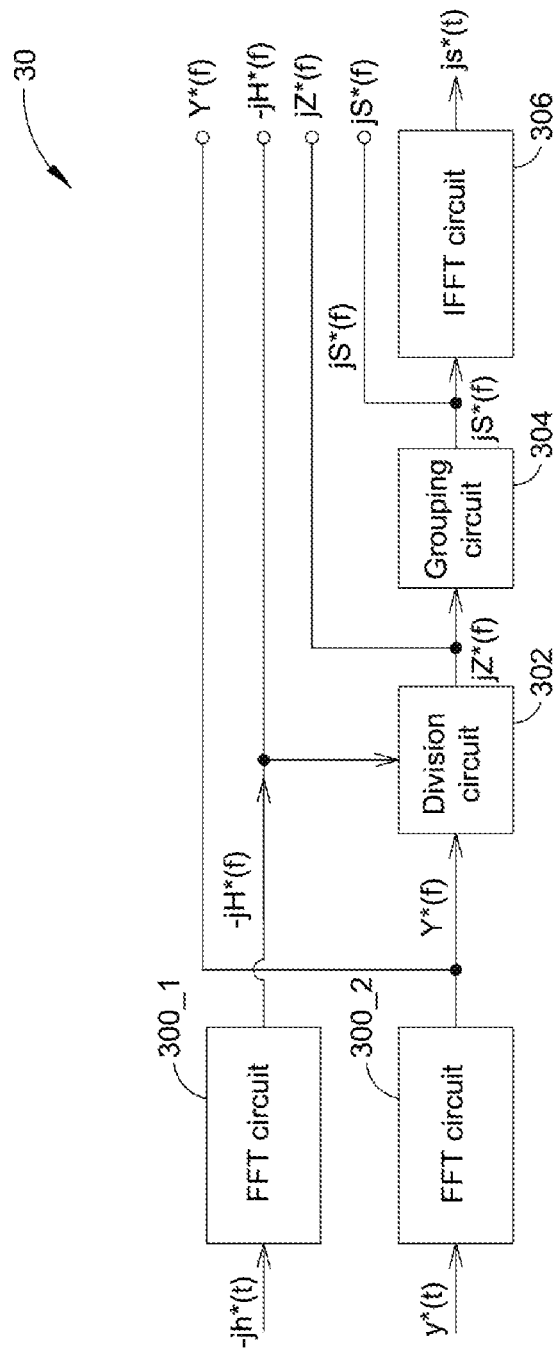
FIG. 3A is another detailed block diagram of the first computation circuit according to the embodiment in FIG. 1.

FIG. 3A shows a detailed block diagram of another first computation circuit 30 in the embodiment in FIG. 1A. As shown in FIG. 3A, similar to the first computation circuit 20 in FIG. 2A, the first computation circuit 30 in this embodiment also includes FFT circuits 300_1 and 300_2, a division circuit 302, a grouping circuit 304 and an IFFT circuit 306, which have similar coupling relationships and operations. The grouping circuit 304 further determines whether the convolution restored frame signal y*(t) includes a spectrum inverted signal, and meanwhile performs a hard decision. Accordingly, before the grouping circuit 304 completes its determination, the FFT circuits 300_1 and 300_2 first output a transformed channel estimation parameter −jH*(f) and a transformed convolution restored frame signal Y*(f) according to a FIFO sequence. When the grouping circuit 304 determines that the convolution restored frame signal y*(t) includes a spectrum inverted signal, the FFT circuits 300_1 and 300_2 then output a transformed channel estimation parameter −jH*(f) and a transformed convolution restored frame signal Y*(t) according to a LIFO sequence. For example, assume that the sequence parameter of the transformed convolution restored frame signal Y*(f) is 0, 1, 2, . . . , 3778 ad 3779. When the grouping circuit 204 determines that the transformed convolution restored frame signal Y*(f) includes a spectrum inverted signal, the FFT circuits 300_1 and 300_2 correspondingly output the transformed convolution restored frame signal Y*(f) having the sequence parameter 0, 3779, 3778, . . . , 2 and 1. When the grouping circuit 304 determines that the convolution restored frame signal y*(t) includes a normal spectrum signal, the FFT units 300_1 and 300_2 correspondingly output the transformed convolution restored frame signal Y*(f) having the sequence parameter 0, 1, 2, . . . , 3778 and 3779. Meanwhile, in this embodiment, the transformed channel estimation parameter −jH*(f) and the transformed convolution restored frame signal Y*(f) represent non-spectrum inverted signals. Further, after receiving the transformed convolution restored frame signal Y*(f) and the transformed channel estimation parameter −jH*(f), the division circuit 302 divides the transformed convolution restored frame signal Y*(f) by the transformed channel estimation parameter −jH*(f) to generate a transformed equalized frame signal jZ*(f), which also represents a non-spectrum inverted signal. Further, when the FFT circuits 300_1 and 300_2 determine that the convolution restored frame signal y*(t) includes a spectrum inverted signal and the output the transformed convolution restored frame signal Y*(f) having the sequence parameter 0, 3779, 3778, . . . , 2 and 1, the IFFT circuit 306 correspondingly receives the transformed original frame signal jS*(f) having the sequence parameter 0, 3779, 3778, . . . , 2 and 1, correspondingly generates the transient original frame signal js*(t), and feeds the transient original frame signal js*(t) back to the channel estimation module 10 to update the channel estimation parameter −jh*(t).

Figure 3B:
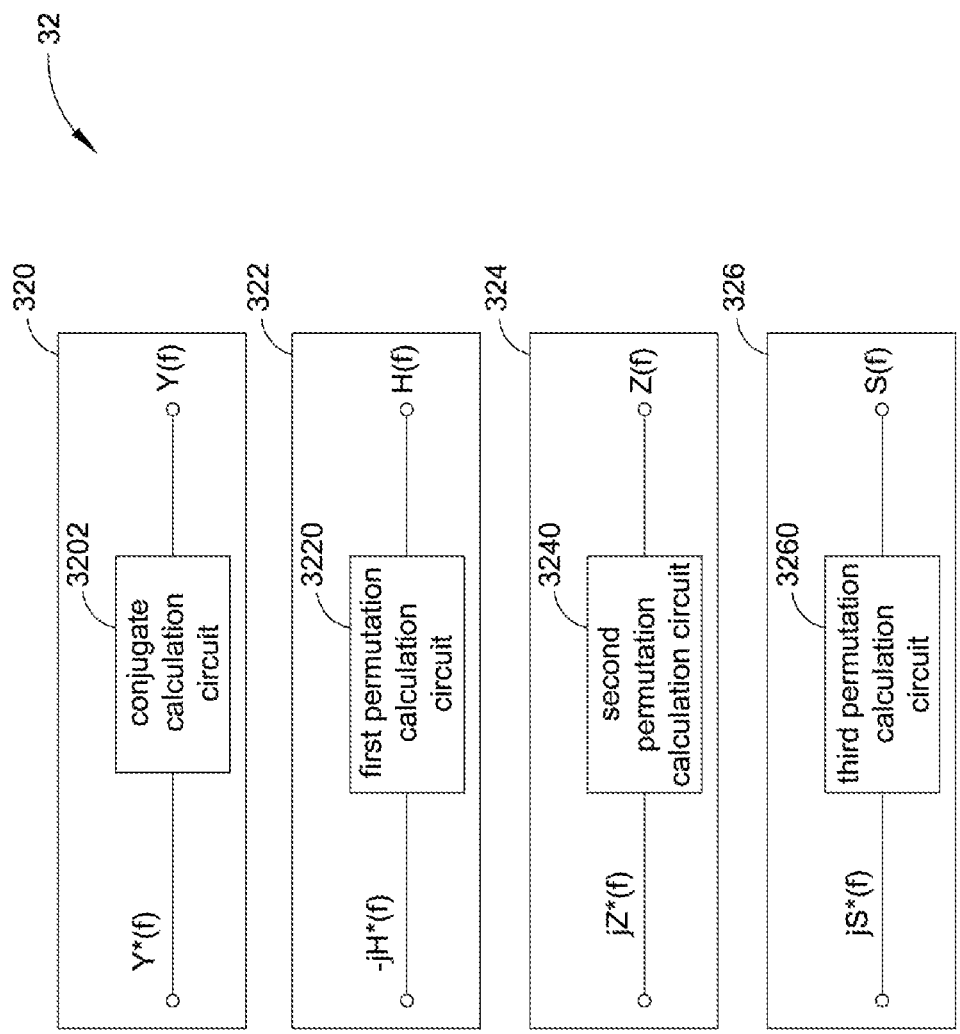
FIG. 3B is a detailed block diagram of another the second computation circuit according to the embodiment in FIG. 1.

FIG. 3B shows a detailed block diagram of another second computation circuit 32 in the embodiment in FIG. 1. As shown in FIG. 3B, similar to the first computation circuit 22 in FIG. 2B, a second computation circuit 32 in this embodiment includes a first calculation circuit 320, a second calculation circuit 322, a third calculation circuit 324 and a fourth calculation circuit 326. One difference of the second computation circuit 32 is that, none of the first calculation circuit 320, the second calculation circuit 322, the third calculation circuit 324 and a fourth calculation circuit 326 includes a buffer; that is, the first calculation circuit 320 includes a conjugate calculation circuit 3202, the second calculation circuit 322 includes a first permutation calculation circuit 3220, the third calculation circuit 324 includes a second permutation calculation circuit 3240, and the fourth calculation circuit 326 includes a third permutation calculation circuit 3260. Accordingly, the conjugate calculation circuit 3202 performs a conjugate operation to transform the transformed convolution restored frame signal Y*(f) to a signal Y(f) (may correspond to the originally received frame signal r(t)). The first permutation calculation circuit 3220 performs a real-imaginary permutation operation to transform the transformed channel estimation parameter −jH*(f) to a signal H(f). The second permutation calculation circuit 3240 and the third permutation calculation circuit 3260 perform another real-imaginary permutation operation to respectively transform the transformed equalized frame signal jZ*(f) and the transformed original frame signal jS*(f) to the signal Z(f) and the original frame signal S(f). As such, the second computation circuit 32 in this embodiment may also obtain the original frame signal S(f), and output the original frame signal S(f) and the signals Y(f) and H(f) to an SNR estimation module to perform an SNR estimation operation. Further, the signal Z(f) is transmitted to a BCH/LDPC decoder of the communication apparatus 1 for associated operations. Further, details of the conjugate operation of the conjugate calculation circuit 3200, and the real-imaginary permutation operations of the first permutation calculation circuit 3220, the second permutation calculation circuit 3240 and the third permutation calculation circuit 3260 are similar to the operations associated with the conjugate calculation circuit 2202, the first permutation calculation circuit 2222, the second permutation calculation circuit 2242 and the third permutation calculation circuit 2262, and shall be omitted herein.

Figure 4:
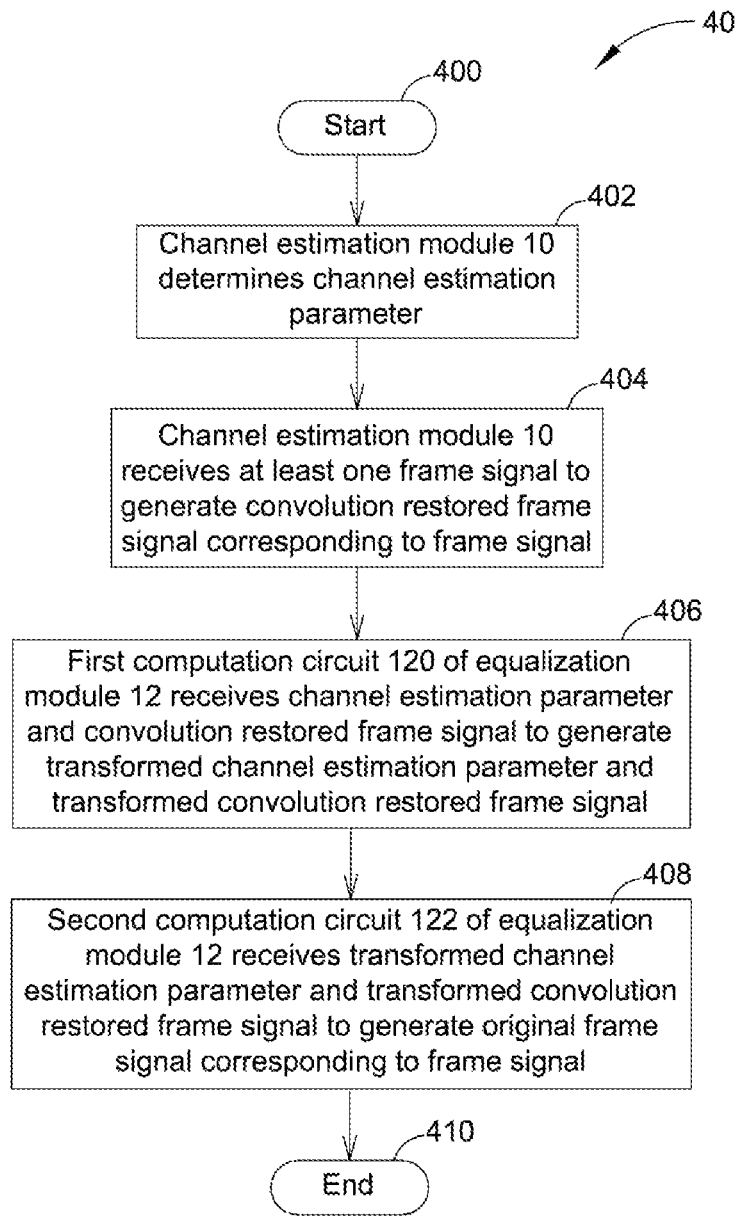
FIG. 4 is a flowchart of a correction process according to an embodiment of the present invention.

The correction method suitable for the communication apparatus 1 of the embodiment may be concluded to a correction process 40, and is coded into a program code that is stored in a storage device of the communication system and executed by a processor module of the communication system. As shown in FIG. 4, the correction process 40 includes following steps.

In step 400, the correction process 40 begins.

In step 402, the channel estimation module 10 determines a channel estimation parameter.

In step 404, the channel estimation module 10 receives at least one frame signal to generate a convolution restored frame signal corresponding to a frame signal.

In step 406, the first computation circuit 120 of the equalization module 12 receives the channel estimation parameter and the convolution restored frame signal to generate a transformed channel estimation parameter and a transformed convolution restored frame signal.

In step 408, the second computation circuit 122 of the equalization module 12 receives the transformed channel estimation parameter and the transformed convolution restored frame signal to generate an original frame signal corresponding to the frame signal.

In step 410, the correction process 40 ends.

In simple, after performing the operation mechanism from step 400 to step 410 of the correction process 40, associated operations of one working cycle is complete. Further, through the control of a processor module or a user, the number of times of performing the correction process 40 may be determined according to the number of frame signals that the communication apparatus 1 receives. However, such is not to be construed as a limitation to the present invention. Details of the correction process 40 may be referred from the description associated with FIG. 1 to FIG. 3, and shall be omitted herein.

It should be noted that, operations of multiple computation circuits are respectively integrated in the first computation circuit and the second computation circuit in the teaching of the embodiments. However, one person skilled in the art may adaptively encode step 406 and step 408 into a plurality of sub-codes that are stored in the storage device(s) of the first computation circuit and/or the second computation circuit. Further, the communication system may further include a plurality of processor units for executing the plurality of sub-codes, which may be executed in a multiplexed manner with the coordination of the plurality of calculation circuits in the first computation circuit and the second computation circuit, hence significantly enhancing processing performance and accuracy of the communication system. It should be noted that, such modification is also encompassed within the scope of the present invention. Further, in practice, one person skilled in the art can understand that the channel estimation module, the equalization module and the SNR estimation module may be realized by digital circuits, and are not to be construed as limitations to the present invention.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A communication apparatus, correcting a situation of an spectrum inverted signal that the communication apparatus receives, comprising:
   a channel estimation module, determining a channel estimation parameter, receiving at least one frame signal to generate a convolution restored frame signal corresponding to the frame signal, wherein the channel estimation parameter, the frame signal and the convolution restored frame signal are time-domain signals; and
   an equalization module, coupled to the channel estimation module, comprising:
      a first computation circuit, receiving the channel estimation parameter and the convolution restored frame signal to generate a transformed channel estimation parameter and a transformed convolution restored frame signal, wherein the transformed channel estimation parameter and the transformed convolution restored frame signal are frequency-domain signals; and
      a second computation circuit, coupled to the first computation circuit, receiving the transformed channel estimation parameter and the transformed convolution restored frame signal to generate an original frame signal corresponding to the frame signal, wherein the original frame signal is a time-domain signal;
      wherein, the first computation circuit further feeds back a transient original frame signal to the channel estimation module to update the channel estimation parameter, and the transient original frame signal is a time-domain signal.

2. The communication apparatus according to claim 1, wherein the first computation circuit comprises:
   a plurality of fast Fourier transform (FFT) circuits, coupled to the channel estimation module, receiving the channel estimation parameter and the convolution restored frame signal to generate the transformed channel estimation parameter and the transformed convolution restored frame signal, wherein both of the transformed channel estimation parameter and the transformed convolution restored frame signal represent a frequency inverted signal;
   a division circuit, coupled to the plurality of FFT circuits, receiving the transformed convolution restored frame signal and the transformed channel estimation parameter to generate a transformed equalized frame signal, wherein the transformed equalized frame signal represents a frequency inverted signal and is a frequency-domain signal;
   a grouping circuit, coupled to the division circuit, receiving the transformed equalized frame signal, determining whether the transformed equalized frame signal is the spectrum inverted signal, and correspondingly outputting a determination signal and a transformed original frame signal according to a sequence parameter; and
   an inverse fast Fourier transform (IFFT) circuit, coupled to the grouping circuit, receiving the transformed original frame signal to generate the transient original frame signal, and feeding back the transient original frame signal to the channel estimation module to update the channel estimation parameter.

3. The communication apparatus according to claim 2, wherein the second computation circuit comprises:
   a first calculation circuit, comprising a first buffer and a conjugate calculation circuit, the first buffer receiving the transformed convolution restored frame signal, the conjugate calculation circuit transforming the transformed convolution restored frame signal to a calculated frame signal;
   a second calculation circuit, comprising a second buffer and a first permutation calculation circuit, the second buffer receiving the transformed channel estimation parameter, the first permutation calculation circuit transforming the transformed channel estimation parameter to a calculated channel estimation parameter;
   a third calculation circuit, comprising a third buffer and a second permutation calculation circuit, the third buffer receiving the transformed equalized frame signal, the second permutation calculation circuit transforming the transformed equalized frame signal to a calculated equalized frame signal; and
   a fourth calculation circuit, comprising a fourth buffer and a third permutation calculation circuit, the fourth buffer receiving the transformed original frame signal, the third permutation calculation circuit transforming the transformed original frame signal to the original frame signal.

4. The communication apparatus according to claim 3, wherein the first buffer, the second buffer, the third buffer and the fourth buffer further receive the determination signal, and output the transformed convolution restored frame signal, the transformed channel estimation parameter, the transformed equalized frame signal and the transformed original frame signal according to a first-in-first-out (FIFO) or sequence or a last-in-first-out (LIFO) sequence.

5. The communication apparatus according to claim 1, wherein the first calculation circuit comprises:
   a plurality of fast Fourier transform (FFT) circuits, coupled to the channel estimation module, receiving the channel estimation parameter and the convolution restored frame signal to generate the transformed channel estimation parameter and the transformed convolution restored frame signal, wherein both of the transformed channel estimation parameter and the transformed convolution restored frame signal represent a non-spectrum inverted signal;
   a division circuit, coupled to the plurality of FFT circuits, receiving the transformed channel estimation parameter and the transformed convolution restored frame signal to generate a transformed equalized frame signal, wherein the transformed equalized frame signal represents a non-spectrum inverted signal;
   a grouping circuit, coupled to the division circuit, receiving the transformed equalized frame signal, determining whether the transformed equalized frame signal is the spectrum inverted signal, and correspondingly generating a transformed original frame signal; and an inverse fast Fourier transform (IFFT) circuit, coupled to the grouping circuit, receiving the transformed original frame signal to generate the transient original frame signal, and feeding back the transient original frame signal to the channel estimation module to update the channel estimation parameter.

6. The communication apparatus according to claim 5, wherein the FFT circuits further refer to a determination result indicating whether the transformed equalized frame signal is the spectrum inverted signal to further determine to output the transformed channel estimation parameter and the transformed convolution restored frame signal according to a first-in-first-out (FIFO) sequence or a last-in-first-out (LIFO) sequence.

7. The communication apparatus according to claim 5, wherein the second computation circuit comprises:
a first calculation circuit, comprising a conjugate calculation circuit, transforming the transformed convolution restored frame signal to a calculated frame signal;
a second calculation circuit, comprising a first permutation calculation circuit, transforming the transformed channel estimation parameter to a calculated channel estimation parameter;
a third calculation circuit, comprising a second permutation calculation circuit, transforming the transformed equalized frame signal to a calculated equalized frame signal; and
a fourth calculation circuit, comprising a third permutation calculation circuit, transforming the transformed original frame signal to the original frame signal.

8. The communication apparatus according to claim 1, wherein the frame signal is correspondingly a frame header signal or a frame body signal; in a first working cycle, when the frame signal that the channel estimation module receives is the header frame signal, the frame header signal is processed by the channel estimation module and the equalization module to correspondingly obtain the original frame signal, the equalization module feeds back the original frame signal to the channel estimation module to update the channel estimation parameter; in a second working cycle following the first working cycle, when the frame signal that the channel estimation module receives is the frame body signal, the frame body signal is processed by the channel estimation module and the equalization module to correspondingly obtain the original frame signal and is used for correcting the situation of the spectrum inverted signal received that the communication apparatus receives.

9. A correction method, for correcting a situation of an inverted signal received that a communication apparatus receives, the communication apparatus comprising a channel estimation module and an equalization module, the correction method comprises:
determining a channel estimation parameter;
receiving at least one frame signal by the channel estimation module to generate a convolution restored frame signal corresponding to the frame signal, wherein the channel estimation parameter, the frame signal and the convolution restored frame signal are time-domain signals;
receiving the channel estimation parameter and the convolution restored frame signal by a first computation circuit of the equalization module to generate a transformed channel estimation parameter and a transformed convolution restored frame signal, wherein the transformed channel estimation parameter and the convolution restored frame signal are frequency-domain signals;
receiving the transformed channel estimation parameter and the transformed convolution restored frame signal by a second computation circuit of the equalization module to generate an original frame signal corresponding to the frame signal, wherein the original frame signal is a time-domain signal;
wherein, the first computation circuit further feeds back a transient original frame signal to the channel estimation module to update the channel estimation parameter, and the transient original frame signal is a time-domain signal.

10. The communication method according to claim 9, wherein the step of receiving the channel estimation parameter and the convolution restored frame signal by the first computation circuit of the equalization module to generate the transformed channel estimation parameter and the transformed convolution restored frame signal further comprises:
receiving the channel estimation parameter and the convolution restored frame signal by a plurality of fast Fourier transform (FFT) circuits to generate the transformed channel estimation parameter and the transformed convolution restored frame signal, wherein both of the transformed channel estimation parameter and the transformed convolution restored frame signal represent a frequency inverted signal;
receiving the transformed channel estimation parameter and the transformed convolution restored frame signal by a division circuit to generate a transformed equalized frame signal, wherein the transformed equalized frame signal represents a spectrum inverted signal and is a frequency-domain signal;
receiving the transformed equalized frame signal by a grouping circuit, determining whether the transformed equalized frame signal is the spectrum inverted signal, and correspondingly outputting a determination signal and a transformed original frame signal according to a sequence parameter; and
receiving the transformed original frame signal by an inverse fast Fourier transform (IFFT) circuit to generate the transient original frame signal, and feeding back the transient original frame signal to the channel estimation module to update the channel estimation parameter.

11. The communication method according to claim 10, wherein the step of receiving the transformed channel estimation parameter and the transformed convolution restored frame signal by the second computation circuit of the equalization module to generate the original frame signal corresponding to the frame signal comprises:
receiving the transformed convolution restored frame signal by a first buffer, and transforming the transformed convolution restored frame signal to a calculated frame signal by a conjugate calculation circuit;
receiving the transformed channel estimation parameter by a second buffer, and transforming the transformed channel estimation parameter to a calculated channel estimation parameter by a first permutation calculation circuit;
receiving the transformed equalized frame signal by a third buffer, and transforming the transformed equalized frame signal to a calculated equalized frame signal by a second permutation calculation circuit; and
receiving the transformed original frame signal by a fourth buffer, and transforming the transformed original frame signal to the original frame signal by a third permutation calculation circuit.

12. The communication method according to claim 11, wherein the first buffer, the second buffer, the third buffer and the fourth buffer further receive the determination signal, and output the transformed convolution restored frame signal, the transformed channel estimation parameter, the transformed equalized frame signal and the transformed original frame signal according to a first-in-first-out (FIFO) sequence or a last-in-first-out (LIFO) sequence.

13. The communication method according to claim 9, wherein the step of receiving the channel estimation parameter and the convolution restored frame signal by the first computation circuit of the equalization module to generate the transformed channel estimation parameter and the transformed convolution restored frame signal further comprises:
receiving the channel estimation parameter and the convolution restored frame signal by a plurality of fast Fourier transform (FFT) circuits to generate the transformed channel estimation parameter and the transformed convolution restored frame signal, wherein both of the transformed channel estimation parameter and the transformed convolution restored frame signal represent a non-spectrum inverted signal;
receiving the transformed channel estimation parameter and the transformed convolution restored frame signal by a division circuit to generate the transformed equalized frame signal, wherein the transformed equalized frame signal represents a non-spectrum inverted signal;
receiving and determining whether the transformed equalized frame signal is the spectrum inverted signal by a grouping circuit, and correspondingly generating a transformed original frame signal; and
receiving the transformed original frame signal by an inverse fast Fourier transform (IFFT) circuit to generate the transient original frame signal, and feeding back the transient original frame signal to the channel estimation module to update the channel estimation parameter.

14. The communication method according to claim 13, wherein the FFT circuits further refer to a determination result indicating whether the transformed equalized frame signal is the spectrum inverted signal to further determine to output the transformed channel estimation parameter and the transformed convolution restored frame signal according to a first-in-first-out (FIFO) sequence or a last-in-first-out (LIFO) sequence.

15. The communication method according to claim 14, wherein the step of receiving the transformed channel estimation parameter and the transformed convolution restored frame signal by the second computation circuit of the equalization module to generate the transformed equalized frame signal to further obtain the original frame signal corresponding to the frame signal further comprises:
transforming the transformed convolution restored frame signal to a calculated frame signal by a conjugate calculation circuit;
transforming the transformed channel estimation parameter to a calculated channel estimation parameter by a first permutation calculation circuit;
transforming the transformed equalized frame signal to a calculated equalized frame signal by a second permutation calculation circuit; and
transforming the transformed original frame signal to the original frame signal by a third permutation calculation circuit.

16. The communication method according to claim 9, wherein the frame signal is correspondingly a frame header signal or a frame body signal; in a first working cycle, when the frame signal that the channel estimation module receives is the header frame signal, the frame header signal is processed by the channel estimation module and the equalization module to correspondingly obtain the original frame signal, the equalization module feeds back the original frame signal to the channel estimation module to update the channel estimation parameter; in a second working cycle following the first working cycle, when the frame signal that the channel estimation module receives is the frame body signal, the frame body signal is processed by the channel estimation module and the equalization module to correspondingly obtain the original frame signal and is used for correcting the situation of the spectrum inverted signal received that the communication apparatus receives.

* * * * *